United States Patent [19]
Bauer

[11] Patent Number: 6,061,450
[45] Date of Patent: May 9, 2000

[54] ALTERNATE TELEPHONE SYSTEM

[76] Inventor: William Dean Bauer, 2055 16th St., Gering, Nebr. 69341

[21] Appl. No.: 08/876,804

[22] Filed: Jun. 17, 1997

[51] Int. Cl.[7] .............................. H04L 9/00; H04M 3/42
[52] U.S. Cl. ............................ 380/49; 380/50; 380/59; 380/9; 379/88.19; 379/88.2; 379/88.21; 379/93.01; 379/93.14; 379/201; 379/210; 379/211; 379/212
[58] Field of Search ................... 380/9, 49, 50, 380/59, 23, 25, 33; 379/34, 90.01, 93.01, 93.02, 93.05, 93.06, 93.07, 93.14, 111, 114, 121, 124, 126, 127, 201, 210, 211, 212, 88.19, 88.2, 88.21, 88.22, 88.23, 100.01, 100.06

[56] References Cited

U.S. PATENT DOCUMENTS

| | | | |
|---|---|---|---|
| 4,972,479 | 11/1990 | Tobias, Jr. et al. | 380/33 |
| 5,153,907 | 10/1992 | Pugh et al. | |
| 5,222,125 | 6/1993 | Creswell et al. | 379/88.21 |
| 5,341,415 | 8/1994 | Baran. | |
| 5,638,428 | 6/1997 | Berku et al. | 379/100.06 |

*Primary Examiner*—Bernarr E. Gregory
*Attorney, Agent, or Firm*—Jennifer L. Bales; Macheledt Bales & Johnson

[57] ABSTRACT

Apparatus for routing local calls around the local exchange carrier includes an intelligent call diverter (ICD) which stores the Automatic Number Identification Code (ANI) of the calling telephone, and a headend for handling routing of telephone calls. When long distance calls are to be routed separately from local calls, the ICD determines whether an outgoing call is local or long distance, and routes the call accordingly. The ICD provides the ANI along with the long distance calls to the headend, and forwards local calls to the local exchange carrier (LEC). When the headend will operate as a competitive local exchange carrier (CLEC), the long distance calls and the local calls are routed to the headend by the ICD along with the ANI. The headend routes the long distance calls and the ANI to the appropriate interexchange carrier and the local calls and the ANI to the LEC or to another CLEC customer's telephone. The ICD may be used in a local area network setup, or with a dedicated twisted pair type line or wireless communication.

24 Claims, 9 Drawing Sheets

ALTERNATE TELEPHONE SYSTEM

BACKGROUND OF THE INVENTION

1. Field of the Invention

The present invention relates to apparatus and methods for routing telephone calls. More specifically, the present invention relates to routing telephone calls around the Local Exchange Carrier.

2. Description of the Prior Art

FIG. 1 (prior art) shows how telephone calls are currently routed. A caller dials telephone 102 to place a call. The call travels via line 104 to Local Exchange Carrier (LEC) 106. In conventional telephone systems, there is no intelligence at the caller's residence. All of the intelligence resides at the Local Exchange Carrier (LEC) or central office 106. LEC 106 knows which telephone is placing a call simply by which physical line the call is coming in on.

A call is placed as follows. The caller picks up the receiver of telephone 102, which connects a circuit in the telephone, allowing current to flow. This current flow alerts switch 108 within LEC 106 that a call is about to be placed from that telephone 102. Switch 108 causes a dial tone to be heard at telephone 102. Next, the caller dials the number. The dialed number's DTMF (Dual-tone Multifrequency) tones are decoded by switch 108 to determine whether the call is local or long distance. If the call is local, LEC 106 simply makes a connection between the calling line 104 and the called line (not shown) and causes the called phone to ring.

If the call is long distance, LEC 106 performs several functions. It determines which long distance carrier the call is to be delivered to, it formats the call in the form required by that long distance carrier, and it generates the ANI (automatic number identification) of the calling telephone 102. The ANI is used by the LEC 106 and IXC 116 for billing purposes. The ANI is also used to identify which long distance carrier or IXC the call should be transferred to. Once switch 108 determines the correct signaling format for the selected IXC, the signal interface 112 generates the SS7 or feature group D signals for transferring the long distance call to IXC 116.

Since the breakup of AT&T, competition between long distance carriers has become fierce, resulting in considerable savings to callers. What all long distance carriers have in common, however, is the need to pay access fees to local carriers in order to use the local phone company's infrastructure. About 45 cents out of every dollar in long distance charges is paid to the local phone companies, split between each end of the call in the form of access charges.

Avoiding the long distance access charges to local exchange carriers is a big incentive. However, in order to do this, the functions performed by the local exchange carrier, as well as the transport infrastructure, must be replaced. In addition, as laws change to permit the creation of competitive local exchange carriers (CLECs) low cost apparatus and methods of distributing local phone calls will need to be developed.

A need remains in the art for apparatus and methods to bypass the local exchange carrier, yet perform necessary local exchange carrier functions in an efficient and cost effective manner.

SUMMARY

The present invention reallocates the necessary functions of the local exchange carrier to allow the local exchange carrier to be bypassed. The heart of the present invention is the ability to store information regarding the customer's telephone number (such as the Automatic Number Identification Code or ANI) at the customer's residence. This permits the Local Exchange Carrier (LEC) to be bypassed, and its functions allocated to other parts of the alternate telephone system, in particular an intelligent call diverter at the customer's premises and a headend at a remote location.

When the alternate telephone system of the present invention is used to handle long distance calls, an intelligent call diverter for use at a caller's premises separately routes local and long distance calls dialed from the caller's premises. The intelligent call diverter includes means for determining whether dialed calls are local or long distance, means for routing local calls to the local exchange carrier, means for routing long distance calls to a second location, designated herein as a head end, means for storing an Automatic Number Identification Code (ANI), and means for routing the ANI to the headend when long distance calls are routed to the headend.

The determining means stores dialed telephone numbers when calls are dialed and examines the stored telephone numbers to ascertain whether the dialed calls are local or long distance.

An alternate access telephone system according to the present invention includes an intelligent call diverter, and means located at the headend for directing long distance calls and the ANI to a particular interexchange carrier according to the ANI.

The invention further includes means for reprogramming the intelligent call diverter from the headend. Reprogramming might modify the ANI or which numbers are defined as being local versus long distance. Preferably, the reprogramming utilizes encrypted communications for security purposes.

Thus, the alternate access telephone system for bypassing the local exchange carrier comprises a headend for routing calls to an interexchange carrier, an intelligent call diverter for use at a caller's premises for diverting calls made from the premises to predetermined numbers to the headend, along with an automatic number identification code (ANI) associated with the caller's premises, and means for transmitting diverted calls and the ANI from the intelligent call diverter to the headend.

In one embodiment of the alternate access telephone system, the intelligent call diverter formats diverted calls and the ANI into ethernet packets, and the transmitting means includes a cable modem connected to the intelligent call diverter for modulating the packets, a cable between the cable modem and the head end for carrying the modulated packets from the intelligent call diverter to the headend, and cable modem termination equipment connected to the cable at the head end for demodulating the packets.

The headend includes an IP phone server connected to the cable modem termination equipment for opening the packets and converting the packets to analog voice, a signal interface connected to the IP phone server for digitizing the analog voice and incorporating interface signalling, and a channel bank connected to the signal interface for converting the digitized signal from the signal interface to T1 format and providing the T1 format data to a predetermined interexchange carrier according to the ANI.

The alternate access telephone system also includes the feature of having the cable modem include means for communicating with a computer. The headend further includes an internet server connected to the cable termination equipment for opening the packets and means for interfacing with the internet connected to the internet server.

In a second embodiment, the intelligent call diverter formats diverted calls and the ANI into ethernet packets, and the transmitting means comprises a telephony modem connected to the intelligent call diverter for modulating the packets, transmission means between the telephony modem and the head end for carrying the modulated packets from the intelligent call diverter to the headend, and telephony modem termination equipment connected to the cable at the head end for demodulating the packets.

Then the headend includes an IP phone server connected to the telephony modem termination equipment for opening the packets and converting the packets to analog voice, a signal interface connected to the IP phone server for digitizing the analog voice and incorporating interface signalling, and a channel bank connected to the signal interface for converting the digitized signal from the signal interface to T1 format and providing the T1 format data to a predetermined interexchange carrier according to the ANI.

Again, the telephony modem may further include means for communicating with a computer and the headend may further include an internet server connected to the telephony modem termination equipment for opening the packets and means for interfacing with the internet connected to the internet server.

In a third embodiment of the present invention, the means for transmitting comprises a first wireless transceiver connected to the intelligent call diverter for modulating the diverted calls and the ANI, a second wireless transceiver at the headend for demodulating the modulated diverted calls and the ANI, and means for transmitting the modulated diverted calls from the first wireless transceiver to the second wireless transceiver.

When the headend is used as a competitive local exchange carrier (CLEC), the ANI is sent to the headend along with all calls made from the customer's premises. The ANI is used to route long distance calls to the appropriate IXC, and to route local calls to the existing LEC or another CLEC customer's telephone.

DETAILED DESCRIPTION OF THE PREFERRED EMBODIMENT

Figure 1:
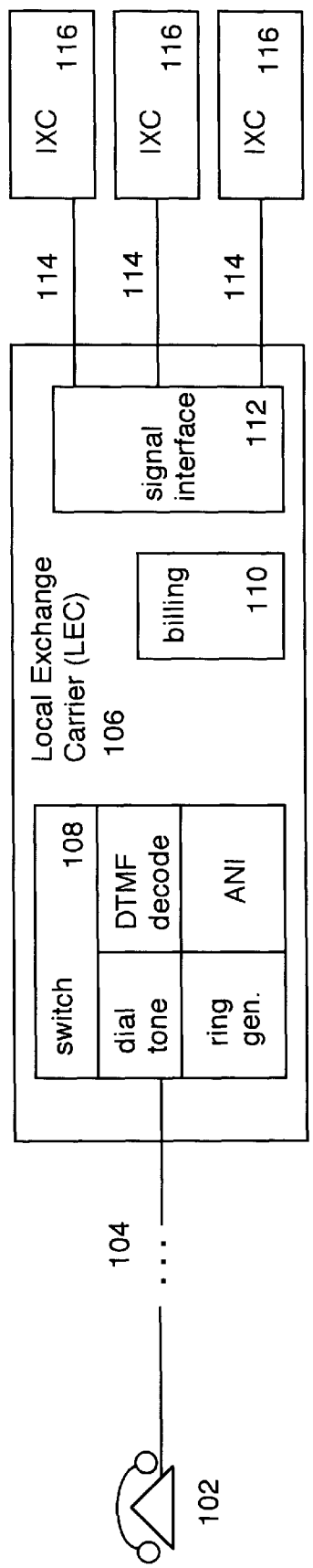
FIG. 1 (prior art) shows how telephone calls are currently routed.
Figure 2A:
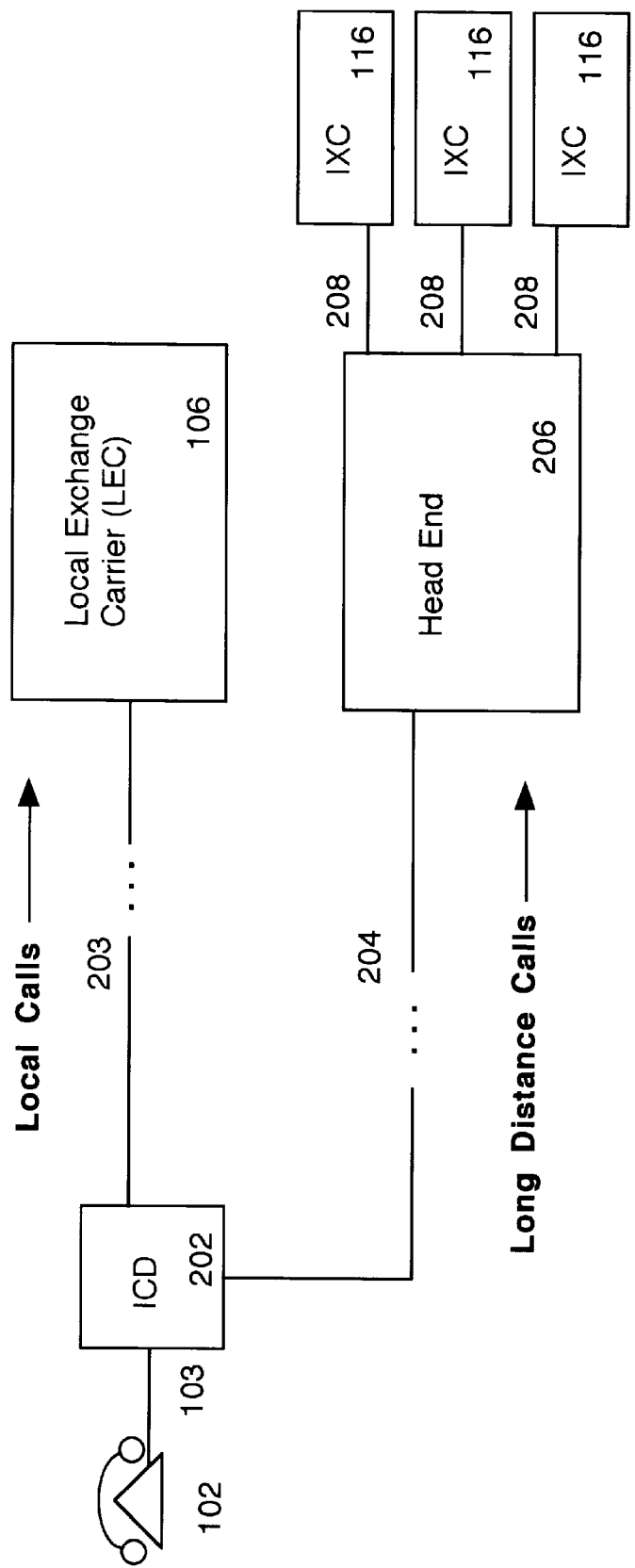
FIG. 2A shows separate routing of local and long distance telephone calls according to the present invention.

FIG. 2A shows separate routing of local and long distance telephone calls according to the present invention. Intelligent Call Diverter (ICD) 202 determines whether an outgoing call is local or long distance, and routes the call accordingly. ICD 202 is located at the callers residence. If the call is local, it is routed to LEC 106 via line 203, and handled in the conventional manner. ICD 202 stores the digits dialed by the caller and analyzes the digits to determine whether the call is local or long distance. If the call is local, ICD 202 sends an offhook signal to LEC 106. Then ICD 202 sends the stored digits to LEC 106, and the call proceeds in the conventional manner.

If the call is long distance, ICD 202 routes it through path 204, to headend 206. Headend 206 communicates with one or more long distance companies or IXC's 116 via line(s) 208. The operation of the preferred embodiment of ICD 202 is shown in detail in FIG. 6. Its functions are briefly described here as well. For long distance calls, ICD 202 provides the dial tone to the caller when the caller lifts the receiver. ICD 202 stores the called number until it determines whether the call is local or long distance. ICD 202 then retrieves and transmits the called number and the ANI (Automatic Number Identification) of the calling party, for billing purposes and to determine which IXC will be used. Thus, ICD 202 takes over the switching functions of LEC 106. As shown in FIGS. 3–6, the signal interface functions of LEC 106 are allocated to headend 206.

Figure 2B:
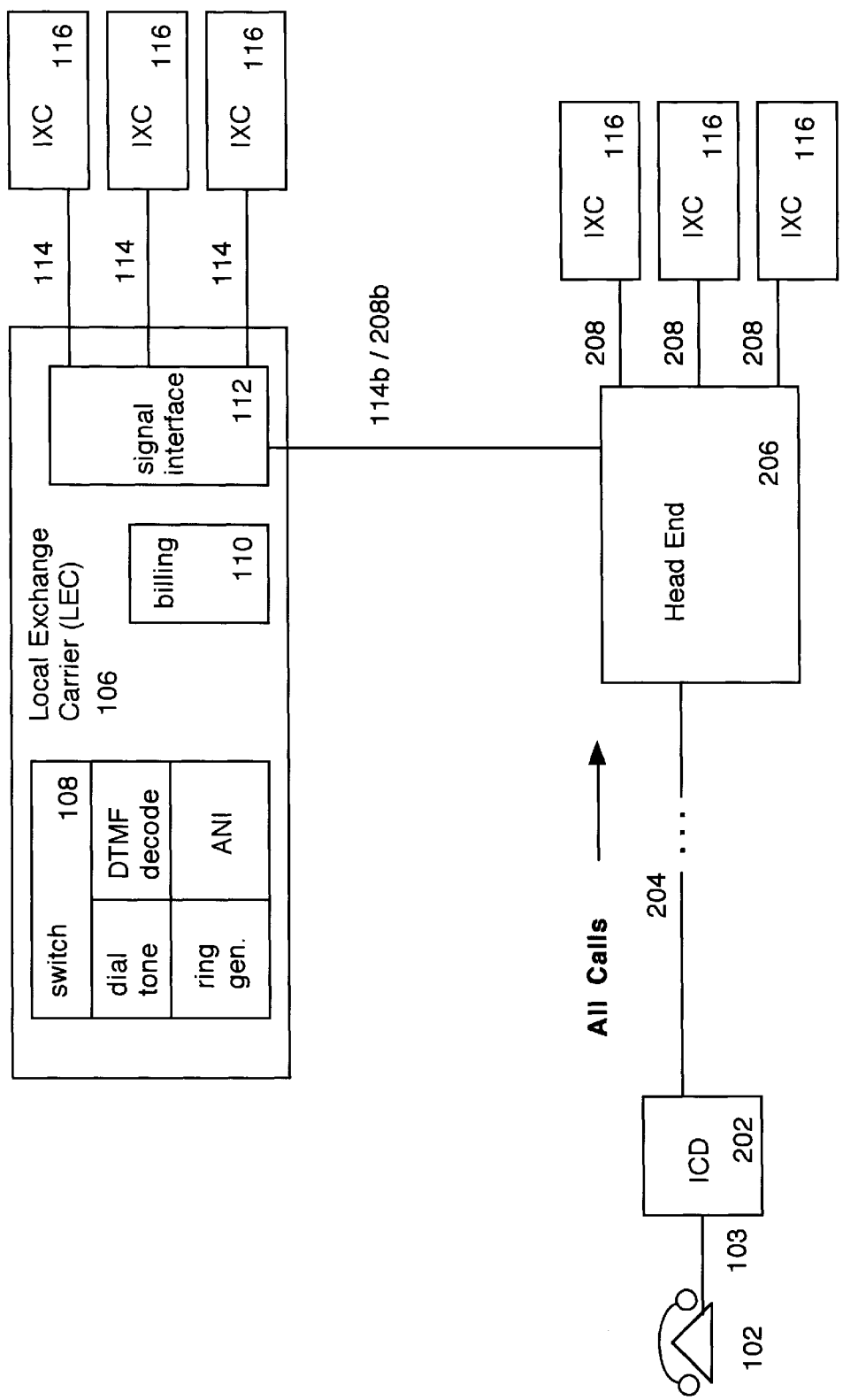
FIG. 2B shows the present invention operating as a Competitive Local Exchange Carrier (CLEC).

FIG. 2B shows routing of local and long distance telephone calls to headend 206, which is acting as a Competitive Local Exchange Carrier (CLEC). Intelligent Call Diverter (ICD) 202 routes all calls to headend 206 via line 204. ICD 202 is located at the callers residence. If the call is local, headend 206 routes the call to LEC 106 via line 114b/208b. Headend 206 routes the call, along with its associated ANI, to LEC 106 as if LEC 106 were another IXC 116. LEC 106 receives the call as if it were coming from an IXC 116 and routes it to the local number accordingly. If the call is long distance, it is routed from headend 206 to the appropriate IXC 116 according to the ANI received from ICD 202 along with the call.

Figure 3:
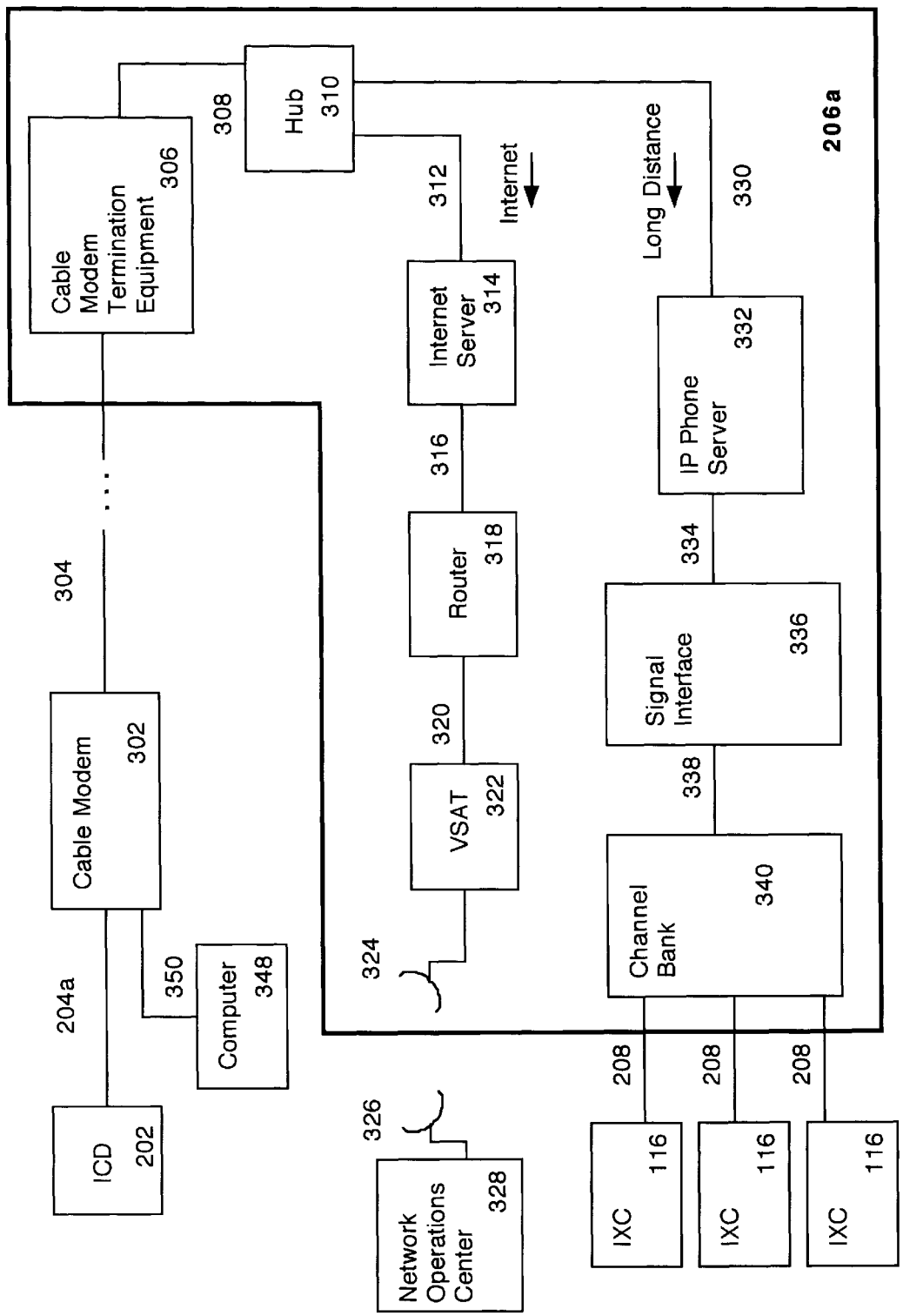
FIG. 3 shows a first embodiment of long distance call routing apparatus, based on a local area network model.

FIG. 3 shows a first embodiment of long distance call routing apparatus, based on a local area network model. In the specific example of FIG. 3, both ICD 202 and a computer 348 can communicate with cable modem 302, via lines 204a and 350 respectively. This configuration will be especially attractive to users who wish to have internet access via a high speed line, and can take advantage of the same apparatus for long distance calls. The data from ICD 202 or computer 348 is transmitted by modem 302 to cable modem termination equipment 306 at the head end using the cable TV RF coaxial plant. Transmission speeds might be 4 mbps to 27 mbps.

Figure 4:
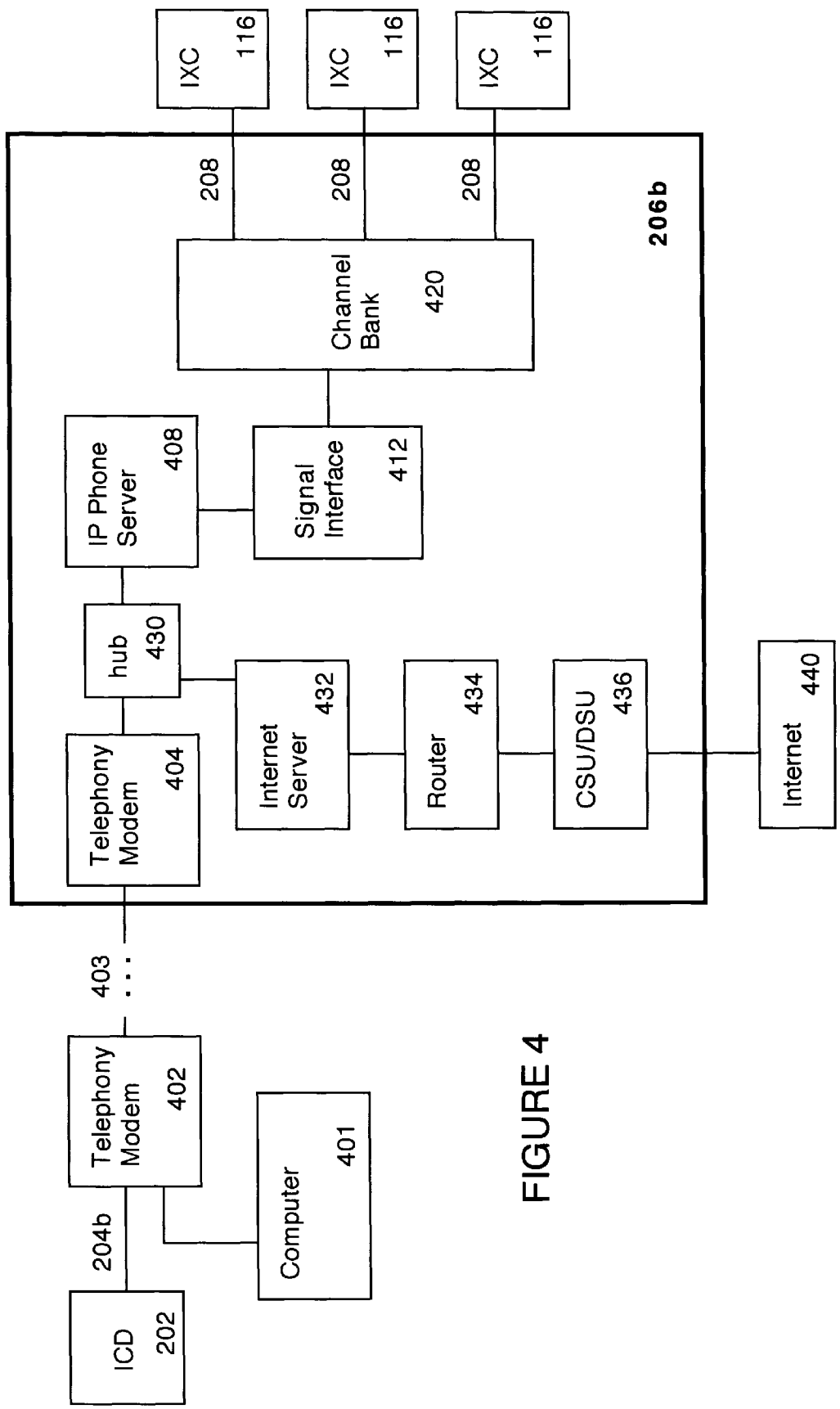
FIG. 4 shows a second embodiment of long distance call routing apparatus, utilizing a direct twisted pair connection.

Termination equipment 306 reformats the data into ethernet packets and passes it to hub 310 via line 308. Hub 310 passes the packets to internet server 314 via line 312, and to IP phone server 332 via line 330. Internet server 314 and IP phone server 332 examine the IP address of the packets to determine which packets to handle and which to ignore. Internet server 314 transfers data to the internet. An example of a path might be to router 318 (via line 316), to VSAT terminal 322 (via line 320), and finally to network operations center 328 via satellite dishes 324, 326, and a satellite (not shown). A conventional path to the internet, as shown in FIG. 4, could also be used.

IP phone server 332 passes analog voice to signal interface 336 via line 334. IP phone server 332 is not required to separately handle the ANI information for routing the phone call because the ANI is embedded in the data. Signal interface 336 converts the analog voice into digital data, such as encoded 64 Kbit ADPCM voice data, and incorporates SS7 or feature group D interface signalling.

Channel bank 340 then converts the digital data into a T1 format, and passes it to the appropriate Interexchange Carrier (IXC) 116 via a line 208. Channel bank 340 is conventional, off the shelf equipment, which requires SS7 or feature group D inputs. If headend 206a is operating as a CLEC as shown in FIG. 2B, Channel bank 340 also communicates with LEC 106 via line 208b, as shown in FIG. 2B. FIG. 4 shows a second embodiment of long distance call routing apparatus, utilizing a direct twisted pair (or fiber optic or other standard transmission means) connection. ICD 202 communicates over line 204b with telephony modem (ISDN, ADSL, ATM, etc.) 402. A computer 401 may also communicate data to modem 402. Modem 402 is connected by twisted pair connection 403 to a matching modem 404 at the head end 206b. Twisted pair connection 403 is similar to conventional phone line. Transmission is digital, via IP packets or the like, over ATM for example.

Modem 404 transfers the data to hub 430, which communicates with IP phone server 408. IP phone server 408 transfers the data via signal interface 412 to channel bank 420, which communicates with the appropriate IXC 116 over a line 208. Again, if headend 206b is operating as a CLEC as shown in FIG. 2B, Channel bank 420 also communicates with LEC 106 via line 208b, as shown in FIG. 2B. Signal interface 412 and channel bank 420 are similar to those shown in FIG. 3. Hub 430 also communicates with internet server 422, which transfers data to the internet 440 via router 434 and CSU/DSU 436.

Figure 5:
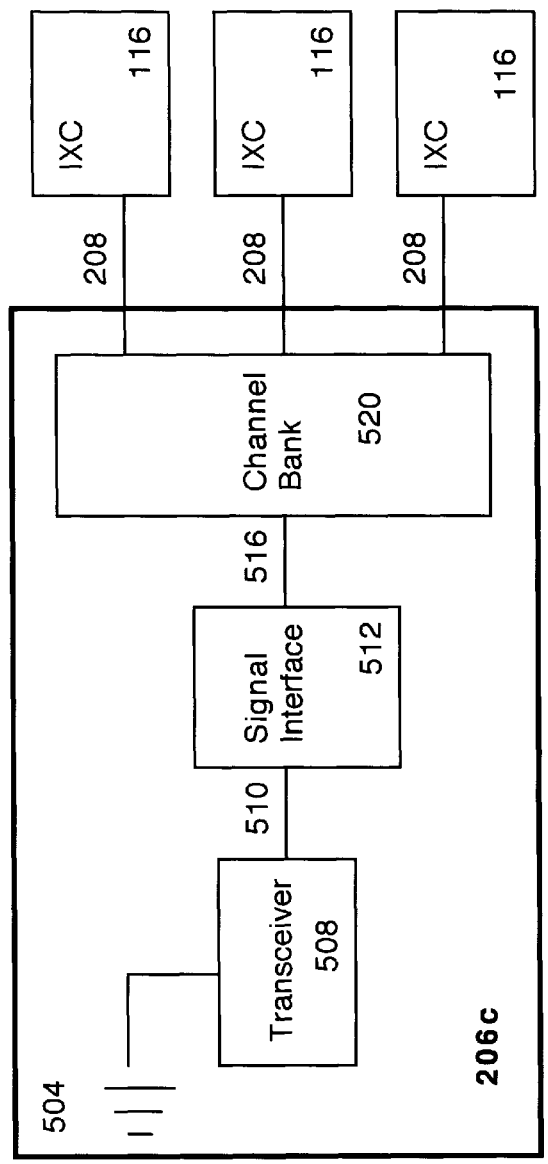
FIG. 5 shows a third embodiment of long distance call routing apparatus, utilizing a wireless connection.
Figure 5:
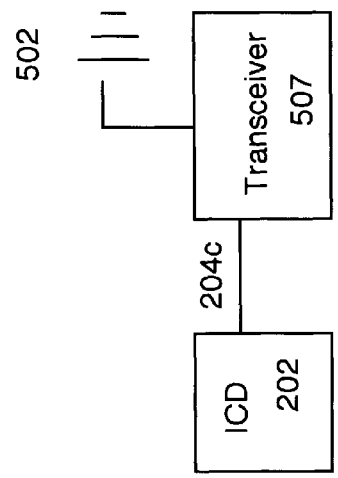

FIG. 5 shows a third embodiment of long distance call routing apparatus, utilizing a wireless connection. ICD 202 transmits data over line 204c to transceiver 507, which upconverts or modulates the data to radio frequency. For example, ISM (2.4 GHz to 2.4835 GHz) might be used. Antenna 502 transmits the RF data to an antenna 504 at the head end 206c. Transceiver 508 downconverts the data to analog voice.

The analog voice out of transceiver 508 passes to signal interface 512 over line 510. The data out of signal interface 512 is passed to channel bank 520 over line 516. Then the data is transferred to an IXC 116 via a line 208. Again, if headend 206c is operating as a CLEC as shown in FIG. 2B, Channel bank 520 also communicates with LEC 106 via line 208b, as shown in FIG. 2B. Signal interface 512 and channel bank 520 are similar to those shown in FIG. 3.

Figure 6A:
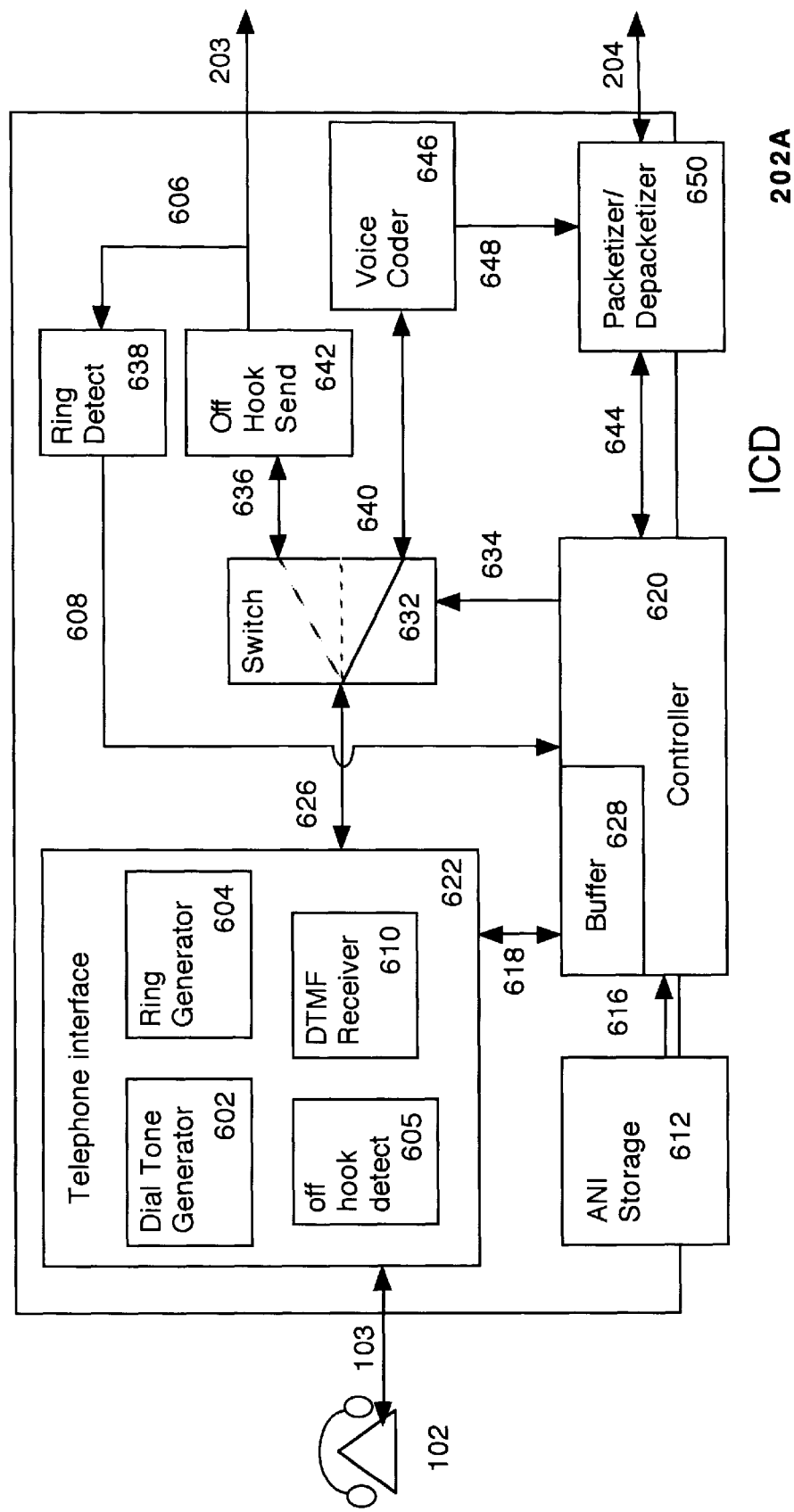
FIG. 6A shows a detailed block diagram of an Intelligent Call Diverter of FIG. 2, used to separately route local and long distance telephone calls.

FIG. 6A shows a detailed block diagram of Intelligent Call Diverter (ICD) 202A for use in the configuration of FIG. 2A, for handling local calls and long distance calls separately. An outgoing call is illustrated in this figure, but this device also handles incoming long distance calls, as described below. Telephone interface block 622 handles most of the functions handled by the LEC switch 108 in a conventional phone system. When the caller lifts the receiver of telephone 102, off hook detect block 605 senses that the line is open and communicates with dial tone generator 602, which returns a dial tone via line 103.

When the caller dials a number, DTMF receiver 610 converts the touch tone dialed number to digits, and communicates the digits via line 618 to controller 620, where they are stored in buffer 628. Controller 620 examines the digits to determine whether the intended call is a long distance or local call. If it is a long distance call, controller 620 retrieves the caller's phone number from ANI storage 612, and sets switch 632 to use line 640. Switch 632 is a physical switch such as a relay. At the same time, controller 620 sends a request to head end 206 to set up a call via line 644, packetizer 650, and line 204, and receives a response to go ahead. Then, controller 620 passes the called number and the ANI to the head end 206.

Head end 206 establishes a line via the appropriate IXC 116 to the called party, and the called party's LEC 106 (or ICD 202, if the called party has one) generates a ring. If the called party answers the phone call proceeds. Voice coder 646 digitizes the outgoing analog voice, and packetizer 650 packetizes it for transmittal over line 204. Received voice data is depacketized and converted to analog form.

If a call comes in from LEC 106 while the long distance call is active, ring detect 638 communicates this fact to controller 620. Controller 620 then instructs telephone interface 622 to pass a call waiting indication to telephone 102. The caller then has the choice of ignoring the incoming call from LEC 106 or flashing to cause switch 632 to change to line 636. Similarly, if a long distance call is received while a local call from LEC 106 is active, a packet comes in via line 204, packetizer/depacketizer 650, and line 644 to controller 620, indicating that a long distance call is coming in from headend 206. Controller 620 then instructs telephone interface 622 to pass a call waiting indication to telephone 102. The caller then has the choice of ignoring the incoming call from headend 206 or flashing to cause switch 632 to change to line 640.

Long distance calls may arrive from LEC 106 or from headend 206. In order for a long distance call to arrive from headend 206, headend 206 must have an arrangement with the caller's IXC to route long distance calls to headend 206 when appropriate. The IXC must have in its database instructions to route the call to the headend under these circumstances.

In the preferred embodiment, ICD 202 may be reprogrammed remotely. Such reprogramming might include changing the ANI in ANI storage 612, changing which calls are defined as long distance calls, or instructing ICD 202 not to place long distance calls anymore (if the customer has an unpaid bill for example). Controller 620 does full ten digit analysis of called numbers, so specific intralata calls could be selectively routed through the headend as well. For example, 911 calls could be rerouted through he headend if the line to LEC 106 is nonfunctional.

Such reprogramming could operate as follows, as an example: the reprogramming function dials the telephone number of telephone 102. If the customer answers, a message is forwarded stating that maintenance must be performed and requesting that the customer not answer the phone the next time it rings. As an alternative, the message could inform the customer that it was switching to maintenance mode, and immediately make the switch.

Controller 620 is programmed to answer calls after a specific number of rings. When controller 620 answers the call, the reprogramming function instructs controller 620 to go into reprogramming mode. All communications thereafter are preferably encrypted, for security reasons. Changes to ANI and controller databases are downloaded by the reprogramming function. Reprogramming may be accessed using LEC 106 via line 203 or headend 206 via line 204. Or, a physical interface maybe made at the customer's premises.

Figure 6B:
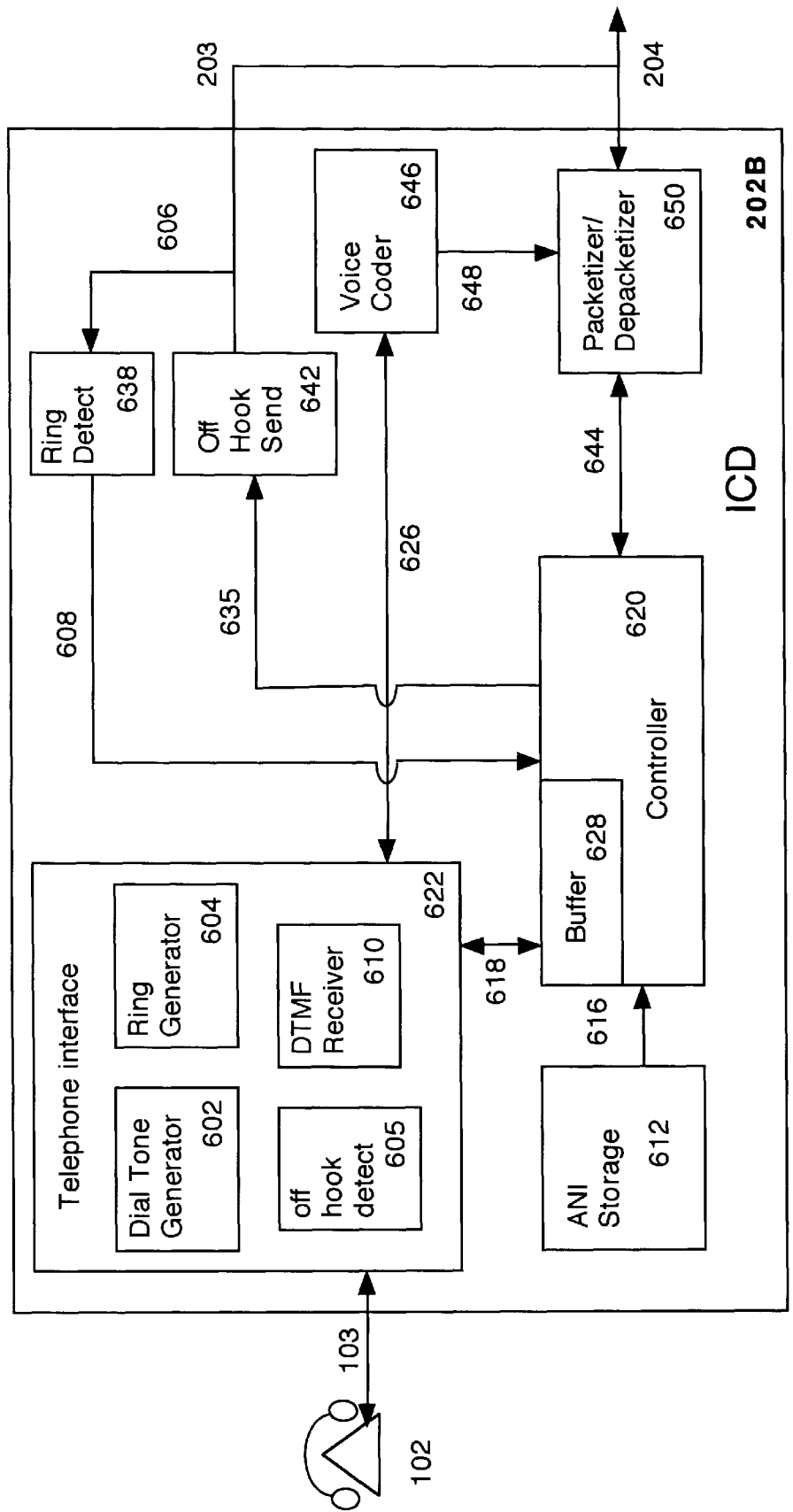
FIG. 6B shows a detailed block diagram of an Intelligent Call Diverter of FIG. 2, used to route local and long distance telephone calls over a twisted pair type configuration to the headend operating as a CLEC.

FIG. 6B shows a detailed block diagram of Intelligent Call Diverter (ICD) 202B, for use in the configuration of FIG. 2B, for routing both local calls and long distance calls to headend 206 acting as a Competitive Local Exchange Carrier (CLEC). FIG. 6B is very similar to FIG. 6A, except that switch 632 has been removed, and line 203 is tied to line 204. In practice, the same unit might be used in the configuration of FIG. 2B as in the configuration of 2A, with these minor modifications. This embodiment is useful with the twisted pair connection illustrated in FIG. 4, because ring detect 638 and off hook send 642, in communication with controller 620, provide the correct handshaking with telephony modem 402.

Figure 6C:
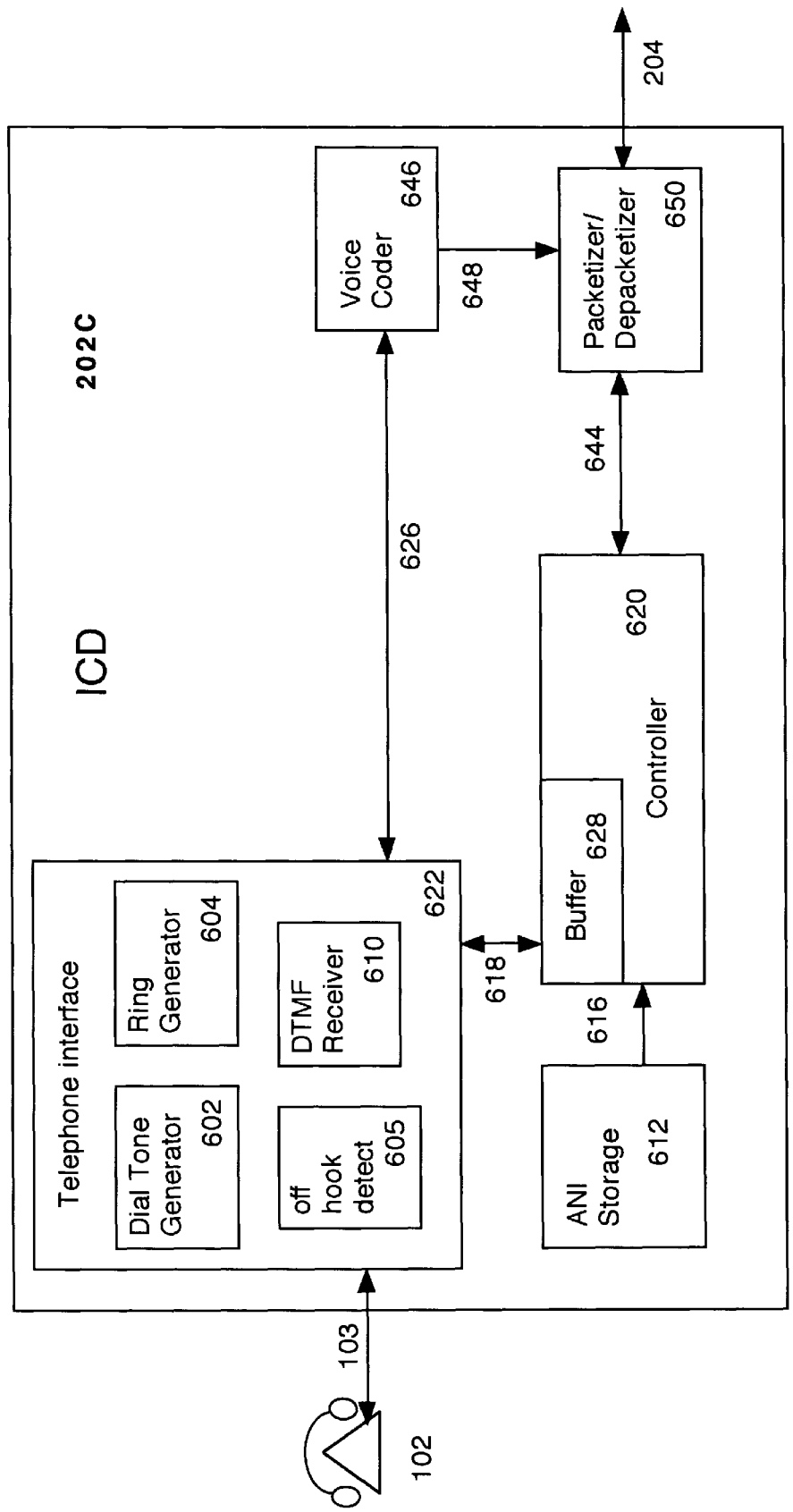
FIG. 6C shows a detailed block diagram of another Intelligent Call Diverter of FIG. 2, used to route local and long distance telephone calls to the headend operating as a CLEC.

FIG. 6C shows a detailed block diagram of another Intelligent Call Diverter (ICD) 202C for use in the configuration of FIG. 2B, for routing both local calls and long distance calls to headend 206 acting as a Competitive Local Exchange Carrier (CLEC). This configuration would be used with the cable modem connection scheme of FIG. 3 or the wireless configuration of FIG. 5, because off hook send 642 and ring detect 638 are not required for handshaking in these configurations.

While the exemplary preferred embodiments of the present invention are described herein with particularity, those skilled in the art will appreciate various changes, additions, and applications other than those specifically mentioned, which are within the spirit of this invention.

What is claimed is:

1. An intelligent call diverter for use at a caller's premises for separately routing local and long distance calls dialed from the caller's premises comprising:

means for determining whether dialed calls are local or long distance;

means for routing local calls to a first location;

means for routing long distance calls to a second location;

means for storing an Automatic Number Identification Code (hereinafter designated by the term "ANI"); and means for routing the ANI to the second location when long distance calls are routed to the second location.

2. The intelligent call diverter of claim 1, wherein said determining means comprises:

means for storing dialed telephone numbers when calls are dialed;

means for examining the stored telephone numbers to ascertain whether the dialed calls are local or long distance.

3. An alternate access telephone system comprising:

the intelligent call diverter of claim 2; and means located at the second location for directing long distance calls and the ANI to a particular interexchange carrier according to the ANI.

4. The alternate access telephone system of claim 3, further including:

means for reprogramming the intelligent call diverter from the second location.

5. The alternate access telephone system of claim 4, wherein said means for reprogramming modifies the ANI.

6. The alternate access telephone system of claim 5, wherein said means for reprogramming also modifies which dialed calls are defined as local or long distance.

7. The alternate access telephone system of claim 6, wherein said means for reprogramming utilizes encrypted communications.

8. An alternate access telephone system for bypassing the local exchange carrier comprising:

a headend for routing calls to an interexchange carrier;

an intelligent call diverter for use at a caller's premises for diverting calls made from the premises to predetermined numbers to the headend, along with an automatic number identification code (hereinafter designated by the term "ANI") associated with the caller's premises; and means for transmitting diverted calls and the ANI from the intelligent call diverter to the headend.

9. The alternate access telephone system of claim 8, wherein the intelligent call diverter formats diverted calls and the ANI into ethernet packets, and wherein the transmitting means comprises:

a cable modem connected to the intelligent call diverter for modulating the packets;

a cable between the cable modem and the head end for carrying the modulated packets from the intelligent call diverter to the headend;

cable modem termination equipment connected to the cable at the head end for demodulating the packets.

10. The alternate access telephone system of claim 9 wherein the headend includes:

an IP phone server connected to the cable modem termination equipment for opening the packets and converting the packets to analog voice;

a signal interface connected to the IP phone for digitizing the analog voice and incorporating interface signalling; and a channel bank connected to the signal interface for converting the digitized signal from the signal interface to T1 format and providing the T1 format data to a predetermined interexchange carrier according to the ANI.

11. The alternate access telephone system of claim 10 wherein the cable modem further includes means for communicating with a computer and wherein the headend further includes:

an internet server connected to the cable termination equipment for opening the packets;

means for interfacing with the internet connected to the internet server.

12. The alternate access telephone system of claim 8, wherein the intelligent call diverter formats diverted calls and the ANI into ethernet packets, and wherein the transmitting means comprises:

a telephony modem connected to the intelligent call diverter for modulating the packets;

transmission means between the telephony modem and the head end for carrying the modulated packets from the intelligent call diverter to the headend;

telephony modem termination equipment connected to the cable at the head end for demodulating the packets.

13. The alternate access telephone system of claim 12 wherein the headend includes:

an IP phone server connected to the telephony modem termination equipment for opening the packets and converting the packets to analog voice;

a signal interface connected to the IP phone for digitizing the analog voice and incorporating interface signalling; and a channel bank connected to the signal interface for converting the digitized signal from the signal interface to T1 format and providing the T1 format data to a predetermined interexchange carrier according to the ANI.

14. The alternate access telephone system of claim 13 wherein the telephony modem further includes means for communicating with a computer and wherein the headend further includes:

an internet server connected to the telephony modem termination equipment for opening the packets;

means for interfacing with the internet connected to the internet server.

15. The alternate access telephone system of claim 8 wherein the means for transmitting comprises:

a first transceiver connected to the intelligent call diverter for modulating the diverted calls and the ANI;

a second transceiver at the headend for demodulating the modulated diverted calls and the ANI; and means for transmitting the modulated diverted calls from the first transceiver to the second transceiver.

16. The alternate access telephone system of claim 15 wherein the headend comprises:

a signal interface connected to the second transceiver for digitizing the demodulated diverted calls and incorporating interface signalling; and a channel bank connected to the signal interface for converting the digitized signal from the signal interface to T1 format and providing the T1 format data to a predetermined interexchange carrier according to the ANI.

17. A method for separately routing local and long distance calls dialed from a caller's premises comprising the steps of:

determining whether dialed calls are local or long distance;

routing local calls to a local exchange carrier;

routing long distance calls to a headend;

storing an Automatic Number Identification Code (hereinafter designated by the term "ANI"); and routing the ANI to the headend when long distance calls are routed to the headend.

18. The method of claim 17, wherein said determining step comprises the steps of:

storing dialed telephone numbers when calls are dialed; and examining the stored telephone numbers to ascertain whether the dialed calls are local or long distance.

19. The method of claim 18 further including the steps of:

formatting long distance calls and ANI into ethernet packets;

modulating the packets;

transmitting the modulated packets from the intelligent call diverter to the headend;

demodulating the packets;

opening the packets;

converting the packets to analog voice;

digitizing the analog voice;

incorporating interface signalling;

converting the digitized signal incorporating interface signalling to T1 format; and providing the T1 format data to a predetermined interexchange carrier according to the ANI.

20. The method of claim 18 further including the steps of:

modulating the long distance calls and the ANI;

transmitting the modulated long distance calls and the ANI from the caller's premises to the headend;

demodulating the modulated long distance calls and the ANI;

digitizing the demodulated diverted calls;

incorporating interface signalling;

converting the digitized signals incorporating interface signalling to T1 format; and providing the T1 format data to a predetermined interexchange carrier according to the ANI.

21. An intelligent call diverter, for use at a caller's premises for routing telephone calls made from the caller's premises to a headend, comprising:

means for routing telephone calls to the headend;

means for storing an Automatic Number Identification Code (ANI); and means for routing the ANI to the headend.

22. An alternate telephone system comprising:

the intelligent call diverter of claim 21; and means located at the headend for directing long distance calls and the ANI to a particular interexchange carrier according to the ANI.

23. The alternate telephone system of claim 22, further comprising means at the headend for directing local calls and the ANI to a local exchange carrier.

24. The alternate telephone system of claim 22, further comprising means at the headend for directing local calls to a local telephone.

* * * * *